United States Patent

Ohsaka

[11] 3,897,698
[45] Aug. 5, 1975

[54] HYDRAULIC CONTROL DEVICE OF TRANSMISSION

[75] Inventor: Takashi Ohsaka, Kawasaki, Japan

[73] Assignee: Kabushiki Kaisha Komatsu Seisakisho, Tokyo, Japan

[22] Filed: Dec. 21, 1973

[21] Appl. No.: 427,336

[30] Foreign Application Priority Data
Dec. 21, 1972 Japan............ 47-45990[U]

[52] U.S. Cl............ 74/732; 74/733; 192/3.57
[51] Int. Cl............ F16h 47/00; B60k 41/22
[58] Field of Search............ 74/731, 732, 733; 192/3.57, 3.51

[56] References Cited
UNITED STATES PATENTS

| | | | |
|---|---|---|---|
| 2,824,632 | 2/1958 | Lucia et al. | 74/732 X |
| 3,058,373 | 10/1962 | Snoy et al. | 74/732 |
| 3,174,362 | 3/1965 | Fisher et al. | 74/732 X |
| 3,202,018 | 8/1965 | Hilpert | 74/732 |
| 3,789,963 | 2/1974 | Bailey et al. | 74/733 X |

FOREIGN PATENTS OR APPLICATIONS 1,949,084  4/1971  Germany ............ 74/731

*Primary Examiner*—Samuel Scott
*Assistant Examiner*—P. S. Lall
*Attorney, Agent, or Firm*—Armstrong, Nikaido & Wegner

[57] ABSTRACT

A hydraulic control device of a power transmission train having a torque converter which is selectively driven either mechanically or hydraulically. The device includes a transmission composed of clutch brakes and gear sets, and has a valve for hydraulically controlling the clutch brakes when the torque converter is driven mechanically. The torque converter is driven hydraulically when the power transmission train is started so that it requires a large driving force and the torque converter is driven mechanically when the power transmission train is driven at high speed to reduce the power loss.

4 Claims, 2 Drawing Figures

HYDRAULIC CONTROL DEVICE OF TRANSMISSION

BACKGROUND OF THE INVENTION

1. Field of the Invention

This invention relates to a transmission for a vehicle, and more particularly to a hydraulic control device for a power transmission train having a torque converter with a direct-coupled clutch selectively driving the torque converter hydraulically or mechanically. The power transmission train also includes a transmission composed of several hydraulically operated clutches and gear sets.

2. Description of the Prior Art

Generally, in order to efficiently transmit power on the occasion of less occurrence of slip in the torque converter and in a high range of the output shaft speed of the torque converter in a power transmission train composed of the torque converter of this type and a transmission, it is well known that the torque converter is provided with a mechanically driven clutch (direct-coupled clutch) and that the direct-coupled clutch is primarily operated so as to drive the transmission directly from a prime mover or vehicle engine. That is, when the vehicle is started and a large driving force is necessary, the torque converter is hydraulically driven and when the vehicle is running at high speed, the direct-coupled clutch is selected and torque converter is mechanically driven so as to efficiently drive the vehicle.

On the other hand, the transmission has plural hydraulically operated clutches for the respective speeds of the vehicle in which the hydraulic pressure, applied to the clutches diameters and number of clutch plates are so provided as to transmit the maximum transmitting torque when the torque converter is hydraulically driven. The maximum torque of the hydraulically operated clutches becomes the stalling torque at the input shaft of the transmission when the torque converter is hydraulically driven and is 2 to 3.5 times as large as the output torque of the prime mover or vehicle engine.

It is, therefore, clear that the hydraulic pressure necessary for operating the clutches of the transmission to transmit the maximum torque at the time when the torque converter is mechanically driven, thereby driving the transmission directly from the prime mover or vehicle engine, may lower in comparison with that necessary for operating the clutches of the transmission to transmit the maximum torque at the time when the torque converter is hydraulically driven.

SUMMARY

It is, therefore, an object of the present invention to provide a hydraulic control device of a power transmission train which is capable of selectively using high and low hydraulic pressures for clutches equipped in a transmission.

It is another object of the present invention to provide a hydraulic control device of a power transmission train which minimizes the power loss of a hydraulic pump for the clutches in the transmission.

It is still another object of the present invention to provide a hydraulic control device of a power transmission train which facilitates easy slip of the clutch-brakes in the transmission when shifting in mechanical driving so as to protect the prime mover.

BRIEF DESCRIPTION OF THE DRAWINGS

These and other objects, features and advantages of the hydraulic control device of a power transmission train according to the present invention will become more fully apparent from the following description taken in conjunction with the accompanying drawings in which like reference numerals and characters designate corresponding parts and components and in which.

DESCRIPTION OF THE PREFERRED EMBODIMENT

Figure 1:
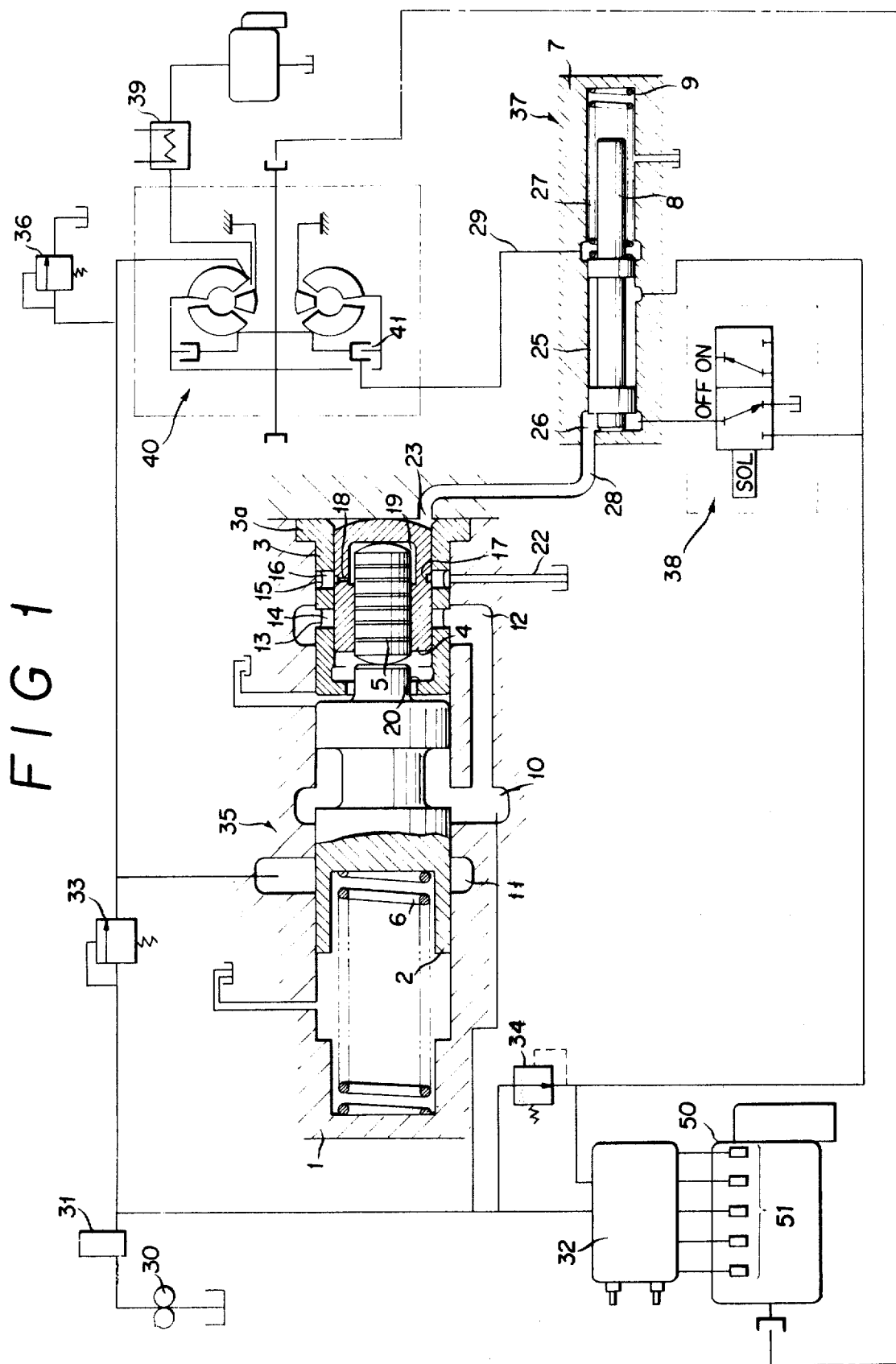
FIG. 1 is a schematic view of the entire hydraulic control device according to the present invention for the explanatory purpose.

Referring now to the drawings, the power transmission train in connection with the present invention has a torque converter 40 including a mechanically driven clutch 41. A transmission 50 includes plural clutches 51 for selecting vehicle speed, and a hydraulic means. The hydraulic means has a hydraulic pump 30, driven by a vehicle engine (not shown) for supplying hydraulic fluid or oil to the hydraulic circuit hereinafter described in greater detail. A filter 31 is connected to the output of the pump 30. A control valve 32 is connected to the output of the filter 31 for selecting the vehicle speed, and a valve 33 controls the hydraulic pressure of the clutches of power transmission train when the torque converter is hydraulically operated. The valve 33 is connected to the output of the filter 31. A pressure-reducing valve 34 is connected to the output of the filter 31 for controlling the hydraulic pressure of a low pressure clutches, a valve 35 controls the hydraulic pressure of the clutches when mechanically driven, and a valve 36 is connected to the output of the valve 33 for controlling the hydraulic pressure at the input of the torque converter 40. A valve 37 selects the mechanical drive for the clutch, and a solenoid valve 38 controls the valve 37 and thereby the mechanical driving of the clutch. An oil cooler 39 is connected to the output of the torque converter 40.

The valve 35 comprises a valve body 1 in which a spool 2 and a sleeve 3 are slidably inserted in a manner that the collar portion 3a of the right end of the sleeve 3 is secured to the valve body 1. First and second annular grooves 13 and 15 are formed on the outer peripheral surfaces of the sleeve 3 in such a manner that plural holes 14 and 16 are formed radially at the bottom wall of the annular grooves 13 and 15, respectively. The first annular groove 13 communicates with a first port 12 formed around the valve body 1, and the second annular groove 15 communicates with a drain 22. A cylindrical piston 4 is slidably inserted into the sleeve 3, and a load piston 5 is slidably inserted into the piston 4. An annular groove 17 is formed on the outer periphery of the piston 4, and an orifice 18 if formed through the piston 4 communicating with the annular groove 17 and the pressure chamber 19 of the load piston 5.

A spring 6 is disposed between the left end of the valve body 1 inside and the spool 2 for urging the spool 2 toward the load piston 5 to shut off the first and second ports 12 and 10 from a third port 11 formed in the valve body 1. If the spool 2 is urged hydraulically against the tension of the spring 6 by the load piston 5 as will be hereinafter described in greater detail, the second port 10 communicates with the third port 11.

The valve 37 has a valve body 7, into which a spool 8 is slidably inserted. A spring 9 is disposed between the spool 8 and the right end of the valve body 7 for urging the spool 8 to the left. The valve 37 also has a pressure chamber 26 at the left side thereof which communicates with the pressure chamber 23 of the piston 4 through a conduit 28. A spring chamber 27 communicates with the clutch 41 through a passage 29.

The operation of the hydraulic control device thus constructed will now be described in the following:

Hydraulic fluid or oil from the pump 30 is fed through the filter 31 to the control valve 32 for selecting the vehicle speed and accordingly one or more of the clutches 51 suitable for the vehicle speeds. In this embodiment, high and low hydraulic pressures can be selectively used by the action of the valve 33 and pressure reducing brake 34. The low hydraulic clutch pressure is controlled by the pressure reducing valve 34 in such a manner that the hydraulic pressure $P2$ downstream from the pressure-reducing valve 34 is lower than the hydraulic pressure $P1$ upstream from the pressure-reducing valve 34. In this embodiment, since the low hydraulic pressure $P2$ for the clutches of the transmission may be equal to the hydraulic pressure for the clutch 41 used for the mechanical drive, the hydrualic pressure $P2$ fed from the filter 31 through the pressure-reducing valve 34 is introduced into the pressure chamber 25 of the valve 37.

When the clutches 51 of the transmission are filled with the hydraulic fluid from the pump 30, additional hydraulic fluid flows through the valve 33, connected to the output of the filter 31, so as to maintain the hydraulic pressure at $P1$.

When the torque converter is hydraulically driven, the spool 8 of the solenoid valve 38 is disposed, as shown in FIG. 1, in the OFF position so that the pressure chamber 26 of the valve 37 is drained. As a result, the spool 8 of the valve 37 is urged to the left by the spring 9 so that the clutch 41 communicates with the spring chamber 27 of the valve 37 and is then drained whereby the torque converter is hydraulically driven. Since the pressure chamber 23 of the piston 4 communicates through the conduit 28 with the pressure chamber 26 of the valve 37, the pressure chamber 23 of the piston 4 is also drained therethrough. Accordingly the piston 4 is urged to the right by the spring 6 disposed between the left end of the valve body 1 and the spool 2 through the spool 2 and the load piston 5. In this state, the pressure chamber 19 of the load piston 5 is also drained through the hole 18 of the piston 4, holes 16 of the annular groove 15 and drain conduit 22 so that there exists no hydraulic pressure for urging the spool 2 to the left. this results in the second port 10 being shut off from the third port 11 of the valve body 1 of the valve 35 by the spool 2.

Figure 2:
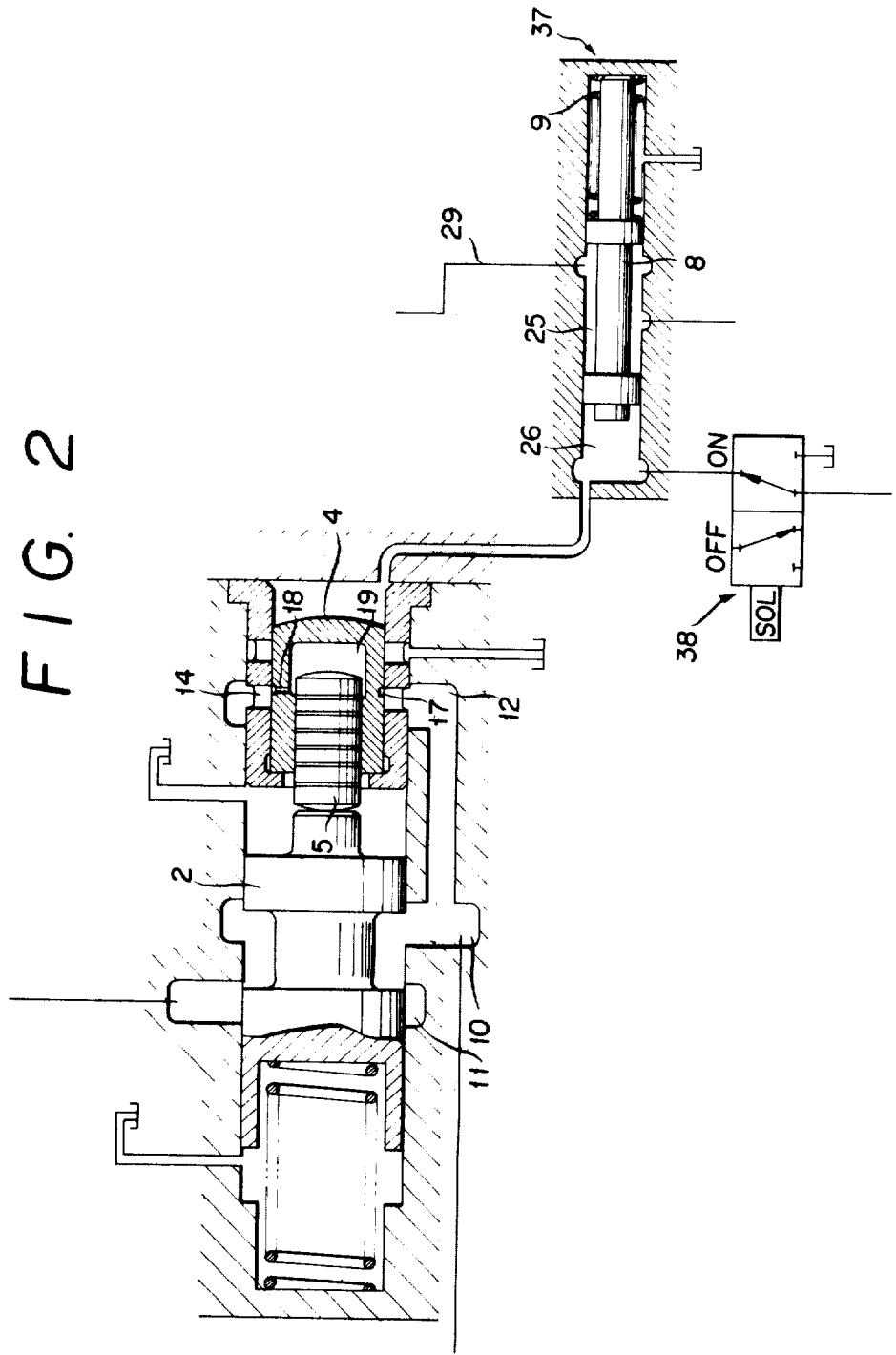
FIG. 2 is a schematic view of the essential part of the hydraulic control device in operation.

When the clutch of the torque converter is converted to the mechanical drive range of the torque converter if the vehicle runs in the corresponding speed range, an electric singal is fed to the solenoid valve 38 for indicating the mechanical drive in a manner known by those skilled in the art, the valve 38 and accordingly the spool of the valve 38 is disposed to ON position, as shown in FIG. 2. As a result, the pressure chamber 26 of the valve 37 communicates through the solenoid valve 38 with the output of the valve 34. As a result, the hydraulic fluid from the valve 34 is fed through the valve 38 to the pressure chamber 26 of the valve 37 so that the spool 8 of the valve 37 is urged to the right against the tension of the spring 9 disposed between the right end of the valve 37 and the spool 8 until the right end of the spool 8 contacts the right end of the valve 37. The pressure chamber 25 of the valve 37 communicates with the conduit 29 connected to the clutch 41 so that the clutch 41 is operated. Accordingly the torque converter is converted to the mechanical drive.

The hydraulic fluid supplied to the pressure chamber 26 of the valve 37 is thus supplied further to the pressure chamber 23 of the piston 4 of the valve 35 to then urge the piston 4 to the left. The biasing force of the spring 6 at that time, disposed between the left end of the valve body 1 inside and the spool 2 of the valve 35, is predetermined so as not to overcome the hydraulic pressure in the pressure chamber 23, thus urging the piston 4, load piston 5 and valve 2 to the left. Accordingly the piston 4 of the valve 35 is moved until it contacts with the annular stopper 20 of the left end of the sleeve 3 of the valve 35. When the piston 4 is thus moved to the left, the annular groove 17 formed on the outer periphery of the piston 4 communicates with the hole 14 formed radially at the bottom wall of the annular groove 13 formed on the outer peripheral surface of the sleeve 3, and further the pressure chamber 19 of the load piston 5 communicates through the orifice 18 with the first port 12 formed around the valve body 1. As a result, the hydraulic pressure in the first port 12 communicates with the pressure chamber 19 of the load piston 5 in the valve 35 so that the piston 5 and spool 2 of the valve 35 are urged leftwardly against the tension of the spring 6 with the result that the second port 10 communicates with the third port 11. Thus, the hydraulic fluid of the second port 10 has the pressure that is determined by the balance of the load of the spring 6 with the hydraulic pressure of the piston 5, and accordingly is relieved to the third port 11, and is fed to the torque converter. At that time, the valve 35 functions as a pressure-reducing valve at the port 11. Therefore, this hydraulic pressure is lower than the hydraulic pressure $P1$ defined by the valve 33 for controlling the hydraulic pressure of the input of the torque converter 40 when driven hydraulically, and the hydraulic fluid fed from the pump 30 passes from the second port 10 to the third port 11 so that the hydraulic pressure in the pump circuit also becomes low, resulting in the lowering of the hydraulic pressure $P2$.

It should be understood from the foregoing description that since the hydraulic control device of the present invention is thus constructed, the hydraulic pressure in the clutch brakes 51 of the transmission is set to a predetermined pressure $P1$ by the valve 33 for controlling the hydraulic pressure of the input of the torque converter 40 when the torque converter is operated hydraulically and is set to a predetermined pressure $P2$ by the valve 35 when the torque converter is operated mechanically. Accordingly the hydraulic control device of the invention may minimize the power loss of the hydraulic pump 30 for the clutches of the transmission 50 and may facilitate easy slip of the clutches or brakes in the transmission when shifting in mechanical driving, so as to protect the prime mover or vehicle engine.

The present invention may be embodied in other specifice forms without departing from the spirit of or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. In a hydraulic control device of power transmission train having a torque converter selectively driven either mechanically or hydraulically, a transmission comprising a plurality of hydraulically operated clutches and gear sets, a first valve means for controlling the hydraulic pressure of the torque converter and clutches, and a second valve means for selecting the speed in the transmission, the improvement comprising a third valve means for controlling the hydraulic pressure of the clutches by reducing the pressure, said third valve means being positioned in a bypass circuit for shortcircuiting the input side of said second valve means and the drain side of said first valve means, a clutch provided in the torque converter for the mechanical driving of the torque converter, fourth valve means for selecting the mechanical drive, said fourth valve means having a pressure chamber communicating with the pressure chamber of said third valve means and a spring chamber communicating with said clutch, and a solenoid valve for controlling said fourth valve means for switching to the mechanical drive, said solenoid valve being operated by an electric signal, wherein the hydraulic pressure for the clutches when said torque converter is mechanically operated is lower than the hydraulic pressure for the clutches when said torque converter is hydraulically operated.

2. A hydraulic control device as set forth in claim 1, wherein said third valve means comprises a sleeve secured at one end thereof to a valve body, a spool slidably inserted into the valve body, a piston slidably inserted into said sleeve, a load piston slidably inserted into said piston, and a spring for urging said spool toward the load piston.

3. A hydraulic control device as set forth in claim 2, wherein both a pressure chamber formed by said piston and the valve body and a pressure chamber formed by the load piston and said piston are drained when said torque converter is hydraulically operated, and the hydraulic fluid in both said pressure chambers is urged against the tension of said spring to urge said spool when said torque converter is mechanically operated.

4. A hydraulic control device as set forth in claim 1, wherein said clutch for the mechanical drive is drained through the spring chamber of said fourth valve means when said torque converter is hydraulically operated, and is operated by the action of the hydraulic pressure when said torque converter is mechanically operated.

* * * * *